US012675462B1

(12) United States Patent
Francisco et al.

(10) Patent No.: US 12,675,462 B1
(45) Date of Patent: Jul. 7, 2026

(54) OFFLINE AVAILABILITY MANAGEMENT FOR WORKSPACE CONTENT

(71) Applicant: Notion Labs, Inc., San Francisco, CA (US)

(72) Inventors: Juan Carlos Evaristo V. Francisco, San Francisco, CA (US); Garrett Fidalgo, San Francisco, CA (US); Austin Louden, San Francisco, CA (US); Natalie Bahmandeji, New York, NY (US); Raymond Xu, New York, NY (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/422,145

(22) Filed: Dec. 16, 2025

Related U.S. Application Data

(60) Provisional application No. 63/899,552, filed on Oct. 15, 2025.

(51) Int. Cl.
    *G06F 16/23* (2019.01)
    *G06F 16/27* (2019.01)

(52) U.S. Cl.
    CPC .......... *G06F 16/2372* (2019.01); *G06F 16/27* (2019.01)

(58) Field of Classification Search
    CPC .... G06F 16/2372; G06F 16/27; G06F 16/273; G06F 16/275; G06F 16/278
    See application file for complete search history.

(56) References Cited

U.S. PATENT DOCUMENTS

| | | | | |
|---|---|---|---|---|
| 7,272,815 | B1* | 9/2007 | Eldridge | G06F 8/71 717/109 |
| 2006/0206866 | A1* | 9/2006 | Eldrige | G05B 15/02 717/122 |
| 2007/0078950 | A1* | 4/2007 | Hopkins | G06F 16/00 707/E17.107 |
| 2015/0163206 | A1* | 6/2015 | McCarthy | G06F 21/6227 726/4 |
| 2017/0041296 | A1* | 2/2017 | Ford | G06F 21/64 |
| 2018/0268045 | A1* | 9/2018 | Orman | H04L 63/101 |

* cited by examiner

*Primary Examiner* — Merilyn P Nguyen
(74) *Attorney, Agent, or Firm* — Perkins Coie LLP; Alberto Araiza Lena Petrovic; Vikram Iyengar

(57) ABSTRACT

Offline availability management for workspace content systems is disclosed. A system receives requests identifying database objects for offline availability. The system inserts entries into a first data structure identifying the object, and inserts lists into a second data structure indicating conditions for offline availability. Lists include an origin identifier for the initiating object, a source identifier for intermediate propagation objects, and an object identifier for the offline-available object. For collection views, the system inserts additional entries identifying displayed pages and lists indicating offline availability initiated by the collection view. The system stores object content data in a locally persisted data store and, as needed, loads it into memory for offline access by the client.

20 Claims, 9 Drawing Sheets

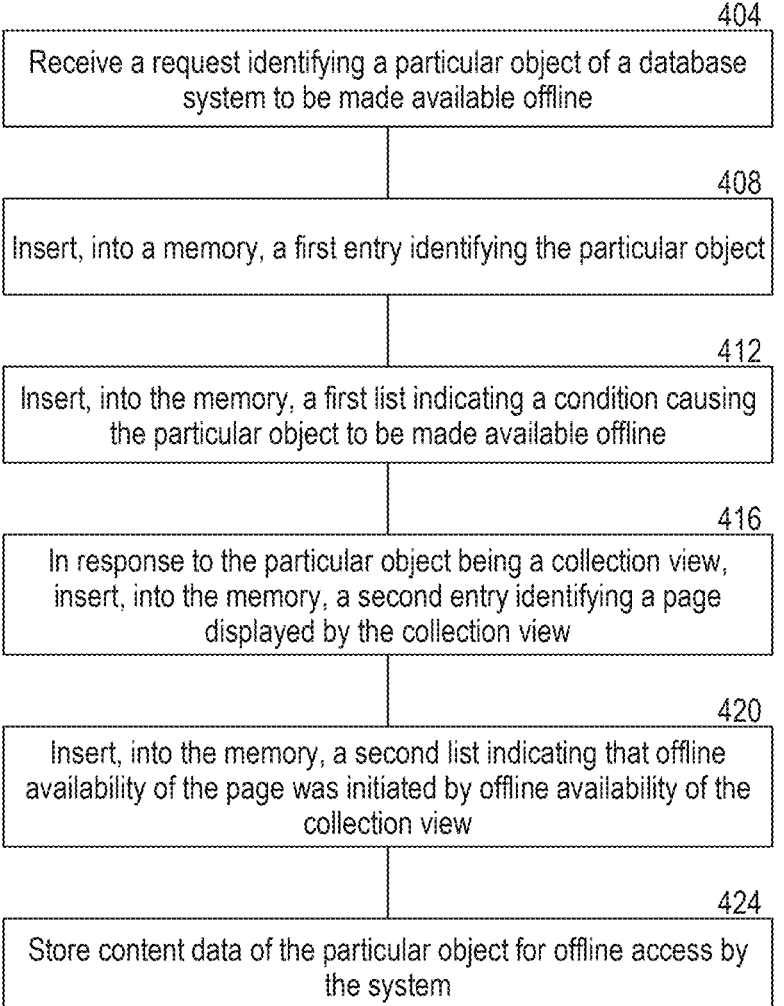

404
Receive a request identifying a particular object of a database system to be made available offline 408
Insert, into a memory, a first entry identifying the particular object 412
Insert, into the memory, a first list indicating a condition causing the particular object to be made available offline 416
In response to the particular object being a collection view, insert, into the memory, a second entry identifying a page displayed by the collection view 420
Insert, into the memory, a second list indicating that offline availability of the page was initiated by offline availability of the collection view 424
Store content data of the particular object for offline access by the system

*FIG. 4*

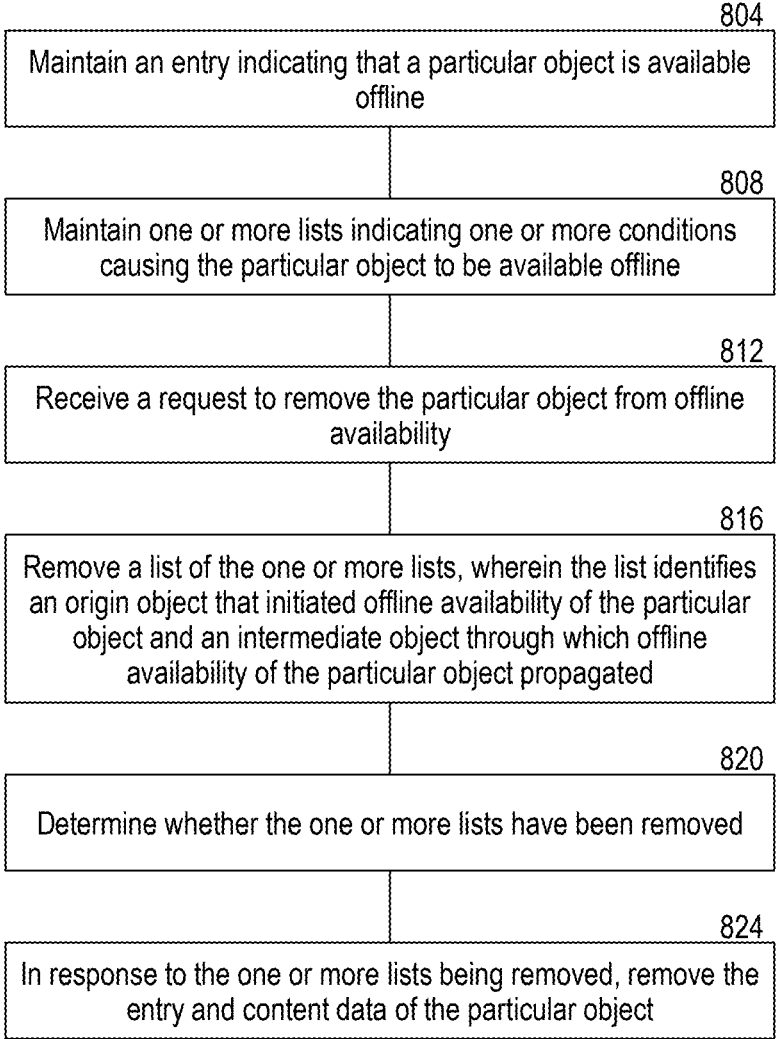

804

Maintain an entry indicating that a particular object is available offline

808

Maintain one or more lists indicating one or more conditions causing the particular object to be available offline

812

Receive a request to remove the particular object from offline availability

816

Remove a list of the one or more lists, wherein the list identifies an origin object that initiated offline availability of the particular object and an intermediate object through which offline availability of the particular object propagated

820

Determine whether the one or more lists have been removed

824

In response to the one or more lists being removed, remove the entry and content data of the particular object

*FIG. 8*

OFFLINE AVAILABILITY MANAGEMENT FOR WORKSPACE CONTENT

CROSS-REFERENCE TO RELATED APPLICATION

This application claims the benefit of U.S. Provisional Patent Application No. 63/899,552, filed Oct. 15, 2025, which is incorporated herein by reference in its entirety.

BACKGROUND

Collaborative workspace applications enable users to create, edit, and share documents, databases, and other content across multiple devices and platforms. These applications typically operate in cloud-based environments where content is stored on remote servers and accessed through client applications on desktop computers, mobile devices, and web browsers. Users expect seamless access to their workspace content regardless of their location or network conditions, allowing them to maintain productivity while traveling, working remotely, or in environments with varying connectivity quality.

However, network connectivity challenges present obstacles for users of cloud-based workspace applications. Users frequently encounter situations with intermittent, slow, or absent internet connections, such as during air travel, in remote locations, or in areas with poor cellular coverage. When connectivity issues occur, users may experience interruptions in their ability to access, view, or edit their workspace content, leading to reduced productivity and frustration. The complexity of modern workspace applications, which often include nested databases, linked collections, and rich media content, compounds these challenges by creating dependencies between different content elements that may not all be available during connectivity disruptions.

BRIEF DESCRIPTION OF THE DRAWINGS

Reference will now be made, by way of example, to the accompanying drawings which show example embodiments of the present application, and in which:

FIG. 4 is a flow diagram illustrating a process for making database objects available offline.

FIG. 8 is a flow diagram illustrating a process for removing database objects from offline availability.

Figure 1:
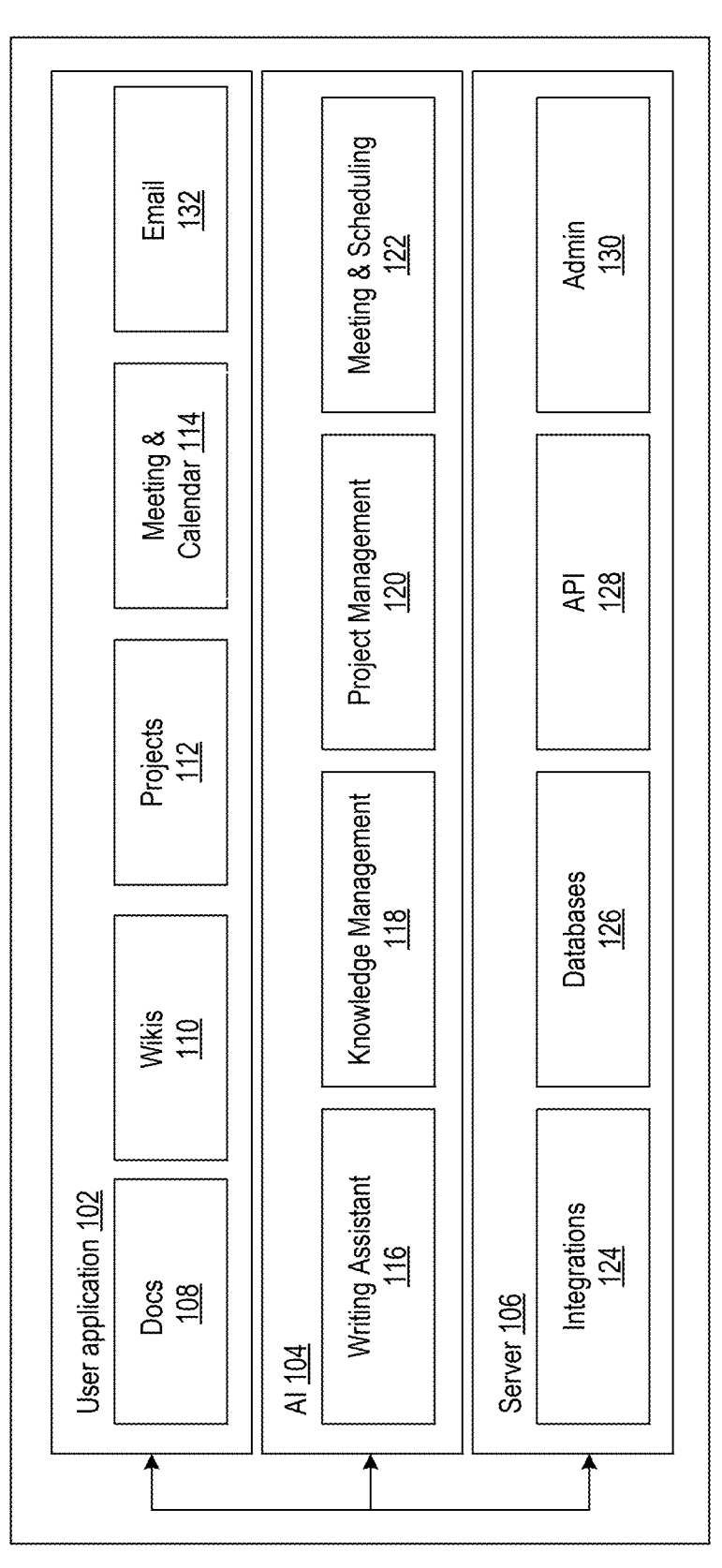
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Workspace applications can provide offline functionality to help users maintain productivity during periods of poor or absent network connectivity. These systems typically allow users to download content for local access, with some applications proactively downloading content based on usage patterns. For example, many productivity applications enable users to download files for offline editing, while entertainment platforms allow downloading of playlists or videos for uninterrupted consumption. However, many existing offline implementations face significant challenges when applied to complex workspace environments that include nested databases, linked collections, and hierarchical content structures.

Techniques for managing offline content often couple the identification of what content is available offline with the reasoning for why that content was made offline, leading to ambiguous removal behaviors and unpredictable user experiences. When users attempt to remove content from offline availability, these systems can struggle to determine whether the content should remain offline due to other dependencies or user actions. Additionally, many systems rely on full content synchronization rather than incremental updates, resulting in inefficient data transfer and slower synchronization times, particularly problematic during unstable connectivity periods. The complexity increases significantly in workspace applications where a single user action, such as making a database available offline, can impact numerous related pages and collections, creating intricate dependency relationships that many existing systems cannot reliably manage.

Existing approaches also lack transparency in communicating to users what content will be available offline and why, eroding user trust and confidence in the offline functionality. Users can be left uncertain about which content will be accessible during offline periods, and the systems can fail to provide clear feedback about the status of offline content synchronization. Furthermore, many existing solutions do not adequately manage scenarios where content can be kept offline for multiple independent reasons, such as explicit user selection combined with automatic synchronization policies, leading to over-downloads or premature removal of needed content when one reason is withdrawn while others remain valid.

The disclosed technology provides solutions for managing offline availability of workspace content using a dual data structure approach that separates the identification of offline content from the causal conditions behind its offline status. The disclosed systems maintain a first data structure that identifies which objects are available offline and a second data structure that tracks lists indicating the conditions causing each object to be offline. Each list includes an origin identifier identifying the origin object that initiated offline availability, a source identifier identifying an intermediate object through which offline availability propagates, and an object identifier identifying the particular object as available offline. In some implementations, each list further includes additional identifier fields. For example, a list may include a user identifier to associate offline availability with a specific user account, and a type identifier to distinguish whether the object was made offline through explicit user toggle or automatic synchronization policies. This separation enables the systems to manage complex scenarios where content can be kept offline for multiple independent reasons, such as explicit user selection combined with automatic synchronization policies, without experiencing over-downloads or premature removal of needed content when one reason is withdrawn while others remain valid.

The disclosed technology addresses the challenges of managing hierarchical content structures by implementing propagation rules that automatically make related content available offline when a user selects a parent object. When a collection view is made available offline, the systems automatically insert entries for pages displayed by the collection view and create corresponding lists indicating that offline availability of these pages was initiated by the collection view. The systems can enforce depth limits and prevent infinite recursion while maintaining referential integrity through constraints that prevent inconsistent chains of collection view references. Additionally, the systems provide transparency to users by tracking and communicating which content will be available offline and the specific reasons for its offline status, thereby building user trust and confidence in the offline functionality.

The disclosed approaches improve synchronization efficiency by enabling incremental updates rather than requiring full content synchronization during connectivity restoration. In some implementations, the client maintains the data structures that track offline availability locally (e.g., in a client-side database) and does not transmit those data structures or lists to a remote server. Instead, the client uses the locally maintained offline-availability information, together with metadata such as a last-downloaded timestamp and a last-downloaded version, to determine what content to request from the server when refetching offline content. The server can then return only the data that is newer than the client's recorded state, while client-side update logic enforces protections that cause the offline state to converge correctly even when updates are applied out of order. The technology also implements state management for offline content, transitioning objects through downloadable and available states to provide feedback about synchronization status. These integrated solutions enable users to maintain productivity during periods of poor or absent network connectivity while providing predictable and transparent offline behavior in complex workspace environments with nested databases, linked collections, and hierarchical content structures.

The disclosed technology advances beyond conventional offline systems by implementing a dual data structure architecture that separates offline content identification from causation implementation. Unlike existing approaches that couple availability determination with justification logic, the disclosed systems maintain independent offline page entries and offline action lists containing origin, source, and object identifiers. In some implementations, each list further includes identifiers to associate offline availability with specific user accounts or to distinguish manual toggles from automatic synchronization. This separation enables dependency tracking where content can remain offline for multiple independent reasons, such as explicit user selection combined with automatic synchronization policies, while preventing premature removal when one condition is withdrawn but others persist, solving complex hierarchical content management challenges.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Terminoloqy

As used herein, a collection refers to a database structure that organizes and contains one or more related pages or content objects within a workspace system.

As used herein, a collection view refers to a user interface component that displays organized sets of related database content.

As used herein, commutative refers to operations that produce identical results regardless of the order in which they are executed.

As used herein, depth limit refers to a predetermined maximum level of nesting to prevent excessive hierarchical traversal operations.

As used herein, an entry refers to a single record or data item stored within a data structure or database table.

As used herein, idempotent refers to operations that produce the same result when executed multiple times with identical parameters.

As used herein, infinite recursion refers to a process that repeatedly calls itself without termination, creating an endless loop condition.

As used herein, an intermediate object refers to a content element that serves as a connection point between origin and target objects.

As used herein, an object refers to a discrete unit of content or data within the workspace system that can be manipulated.

As used herein, an object identifier refers to a unique marker that specifically identifies a particular object within the system database.

As used herein, an origin identifier refers to a unique marker that identifies the initial object that triggered an offline action.

As used herein, an origin object refers to the initial content element that initiates offline availability for other related system objects.

As used herein, a page refers to a content container that can hold various types of blocks and nested content elements.

As used herein, propagation refers to the process of extending offline availability from one object to related dependent content objects.

As used herein, refetch refers to the process of retrieving updated content data from a server to synchronize local cached information.

As used herein, a source identifier refers to a unique marker that identifies intermediate objects through which offline availability propagates.

As used herein, a list refers to a data structure containing multiple related identifier fields that track offline availability relationships.

As used herein, workspace content refers to all data objects, pages, and related elements stored within a collaborative workspace environment.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies Mes-sageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the set of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React. Software Platform FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or nonvisible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action items, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, organize key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be conducted iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
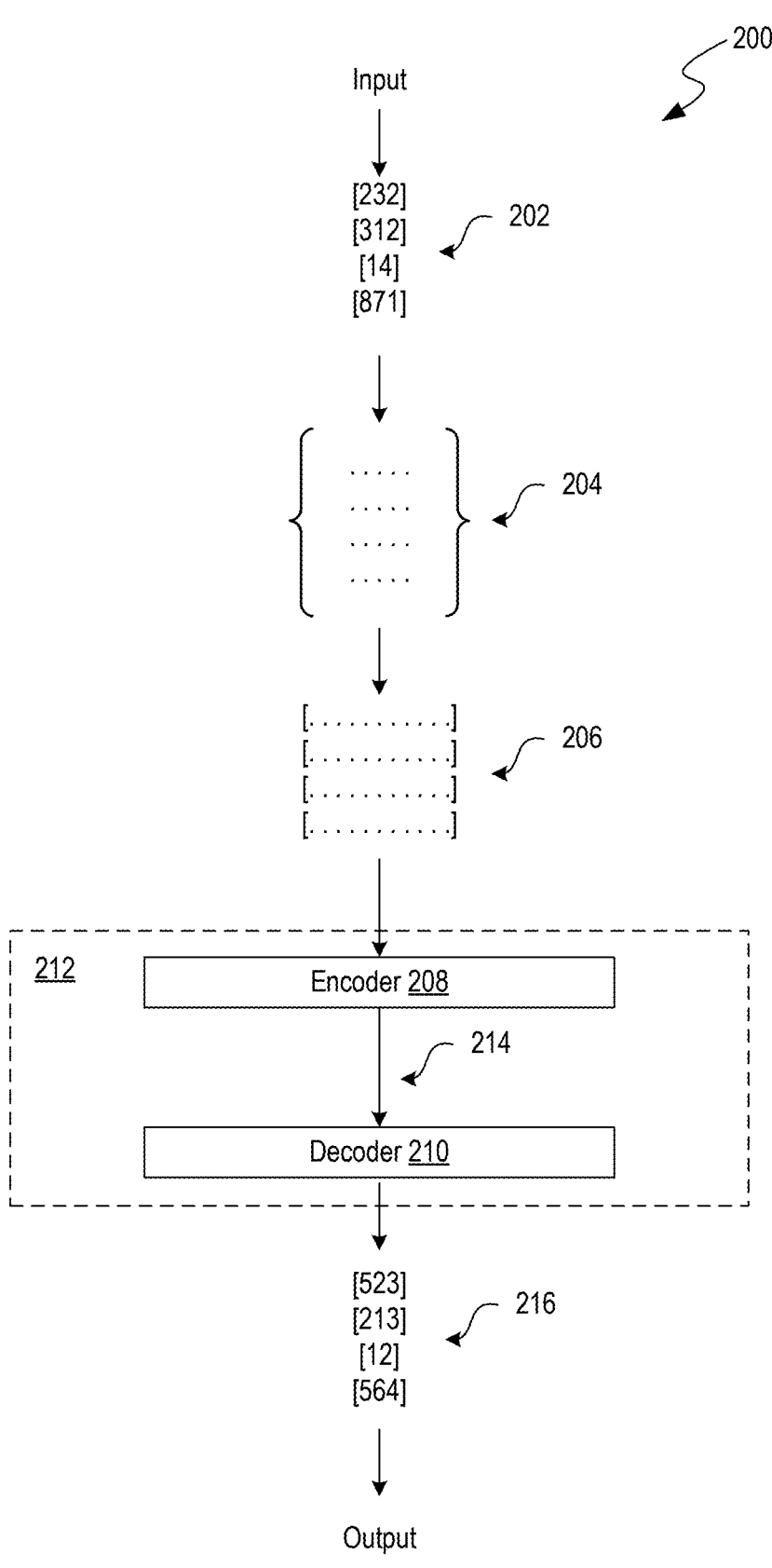
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating ideas based on provided input. For example, the ML model can generate names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or ideas associated with the request. For example, the input can include the question "What is the weather like in San Francisco?" and the output can include a description of the weather in San Francisco. As another example, the input can include a request to brainstorm names for a flower shop and the output can include relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
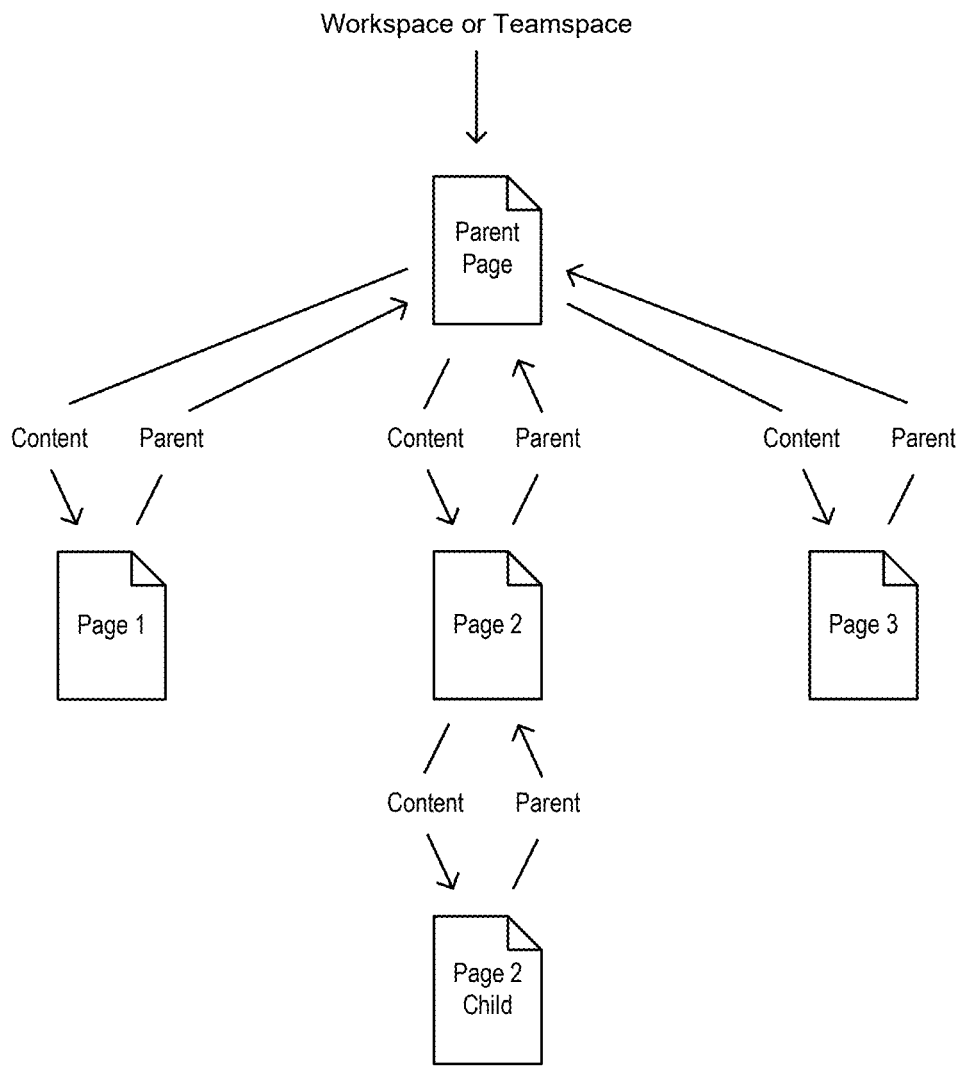
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Offline Availability Management for Workspace Content

FIG. 4 is a flow diagram illustrating a process for making database objects available offline. In some implementations, the process is performed by a computer system, e.g., example computer system 900 illustrated and described in more detail with reference to FIG. 9. Particular entities, for example, platform 100 perform some or all of the steps of the process in other implementations. Platform 100 is illustrated and described in more detail with reference to FIG. 1. Likewise, implementations can include different and/or additional steps or can perform the steps in different orders.

In some implementations, at 404, a system (such as a client device) receives a user request to make a particular object, e.g., a collection view C1 available offline. At 408 and 412, in a single SQLite transaction, an offline_page entry for C1 and a first list (C1, C1, C1) are inserted into an offline_action table stored on disk. For example, the system can issue a first network call to a server API to load C1's metadata. The inserted list can include fewer or additional fields, e.g., (C1, C1, C1, user_123, toggled). Here, user_123 is a meta_user_id field and toggled is an autosync_type field indicating manual user selection rather than automatic synchronization.

At 416 and 420, an offline_page entry and a second list (C1, C1, P1) can be inserted for each displayed child page P1, for example up to 50 pages, using a returned collection layout. To even determine which pages are inside C1, the system can issue a separate batched request that asks the server for the identifiers of all pages currently in the collection view, and then issue one or more additional batched network calls to download the block data, properties, and hierarchical relationships for those page identifiers. At 424, the system can persist the downloaded content for C1 and each page P1-P50 in a local SQLite record cache and, as needed, in memory, so that all of these objects are stored for offline access using the offline_page and offline_action data structures.

A list can include N identifier fields to track complex offline availability relationships across hierarchical content structures, where N is greater than zero. For example, a list (P1) can include only an object identifier when tracking basic offline availability status without propagation tracking. When the system needs to maintain a simple registry of which pages are currently available offline without tracking causation or hierarchical relationships, the system can insert a minimal list containing only the impacted page identifier P1, indicating that page P1 is available for offline access regardless of how or why it was made offline. In some implementations, a list (P1, P1) can include only an origin identifier and an object identifier when tracking simple offline availability without intermediate propagation. When a standalone page P1 is toggled offline without any nested collection views or hierarchical relationships, the system can insert a simplified list containing only the origin page identifier P1 and the impacted page identifier P1, omitting the source identifier field because no intermediate object exists in the propagation chain.

When a user toggles collection view C1 offline at 404, the system can insert a list having five fields (C1, C1, C1, user_456, toggled) into the offline_action table at 412, where C1 serves as the origin identifier, source identifier, and object identifier, user_456 represents the meta_user_id field associating the offline action with a specific user account, and toggled represents the autosync_type field indicating that the collection view was explicitly selected by the user rather than automatically synchronized using system policies. Another list (P5, C7, P8, user_789, autosynced, timestamp_1634567890, version_42, workspace_ABC) can include eight fields, where P5 is the origin page identifier, C7 is the intermediate collection view identifier, P8 is the impacted page identifier, user_789 is the user account identifier, autosynced indicates automatic synchronization, timestamp_1634567890 records when the page was last downloaded, version_42 tracks the content version, and workspace_ABC identifies the collaborative workspace containing the offline content. Lists with greater than eight fields can also be generated.

In some implementations, at 404, the system receives a request identifying a particular object of a database system to be made available offline. The client device can be a smartphone, tablet, laptop, desktop computer, etc. The request is received using a client interface that enables a user to toggle availability for either a page or a collection view. In response, the system inserts an entry for the identified object, such as a collection view C1 with 50 pages into a locally persisted data store (e.g., relational tables in a SQLite database on the device's disk) and maintains lists tracking the origin and propagation of offline availability. These records may be loaded into memory for client operations but are durably stored on disk so that the designated content is prepared for subsequent offline access.

In some implementations, the request toggles an offline availability state of the particular object using a client control that updates a first data structure (sometimes referred to as an offline_page table) and a second data structure (sometimes referred to as an offline_action table). The data structures are stored on the client device in a locally persisted data store (e.g., relational tables in a SQLite database on disk), and may be loaded into working memory for client operations, thereby providing long-lasting, durable storage in non-volatile memory. For example, when a user toggles a collection view C1 containing 50 child pages, the system creates entries for C1 and its children in the first data structure and inserts lists such as (C1, C1, P1) in the second data structure. When the same toggle is switched off, the system deletes the corresponding entries, thereby reversing the offline state while preserving other independent origins. In one implementation, the data structures are implemented as relational database tables persisted in a local SQLite database on the device's disk and read into memory as needed for client operations. Alternative implementations can use other local persistent data stores (e.g., IndexedDB or similar local databases) to maintain origin, source, and impacted identifiers, enabling efficient traversal of hierarchical offline relationships across nested pages and collection views.

In some implementations, the request is generated by the system in accordance with a synchronization policy using autosync logic that proactively selects recent or favorite content. For example, the system can generate a request to offline the 20 most recently visited pages and all pages marked as favorites, inserting entries into the first data structure and lists into the second data structure. When a collection view C2 includes a child page P2, the system automatically generates requests to maintain both C2 and P2 offline, providing transparent and consistent availability.

At 408, the system inserts, into the first data structure, a first entry identifying the particular object, using a schema in which each offline page is represented by a row in the first data structure. For example, when a collection view C1 is toggled for offline use, the system records an entry for C1 with a unique identifier, such as C1_ID=12345, thereby maintaining a persistent reference to provide subsequent offline synchronization and access.

At 412, the system inserts, into the second data structure, a first list indicating a condition that causes the particular object to be made available offline, using the second data structure configured to track propagation of offline states. In some implementations, the operations at 408 and 412 are performed together in a single atomic transaction (e.g., a single SQLite transaction) so that the entry and its corresponding list are created consistently. The first list can include an origin identifier corresponding to the origin page or collection view that initiated offline availability, a source identifier corresponding to the intermediate page or collection view through which the offline state propagates, and an object identifier corresponding to the impacted page that is maintained offline.

For example, when a user toggles a collection view C1 to be available offline, the system inserts lists such as (C1, C1, C1) and (C1, C1, P1), where C1 functions as both the origin identifier and the source identifier, and P1 is the object identifier for a child page P1 in the collection view C1. If P1 includes an inline collection view C2 with a child page P2, the system inserts additional lists, such as (P1, C2, P2), (C2, C2, P2), and (P2, P2, P2), thereby enabling a page like P2 to be maintained offline for multiple independent reasons while the single transaction at 408 and 412 keeps the offline page entry and corresponding lists consistent.

In some implementations, the source identifier identifies at most one collection view using a constraint in the second data structure that limits each list to a single collection view as the intermediate source. For example, when a user toggles collection view C1 containing child page P1 and inline collection view C2, the system generates lists such as (C1, C1, C1) and (C1, C1, P1), but prohibits lists such as (C1, P1, C2) that would include more than one distinct collection view in a single offline action. In particular, each list may reference at most one collection view, thereby maintaining structural integrity and preventing ambiguous offline propagation. In some implementations, multiple lists are associated with a particular object, using the second data structure to record multiple independent conditions for offline availability. For example, a page P2 displayed in collection view C2 can be represented by lists (P1, C2, P2), (C2, C2, P2), and (P2, P2, P2), where P1, C2, and P2 function as distinct origins for keeping P2 offline. Because P2 cannot simultaneously belong to multiple collections, these lists collectively capture all valid offline availability conditions. The page P2 remains available offline so long as at least one of these lists persists in the data structure.

In some implementations, the system determines a count of lists in which the particular object is identified as the object identifier, e.g., using the second data structure to track propagation of offline states across nested structures. For example, page P2 within a collection view C2 can be associated with lists (P1, C2, P2), (C2, C2, P2), and (P2, P2, P2), each reflecting different parent origins. The system decrements the count as parent objects are un-toggled and, once the count equals zero, removes both the first entry from the locally persisted data store (e.g., SQLite on disk) and any cached content data of P2 from working memory, thereby reclaiming storage and providing more efficient offline state management.

At 416, the system, in response to the particular object being a collection view, inserts into the first data structure a second entry identifying a page displayed by the collection view, using the first data structure to persist each entry. For example, when a collection view C1 is toggled offline, the system records an entry for C1 and an additional entry for a displayed child page P1, such that both C1 and P1 are available for offline access.

At 420, the system, in response to the particular object being a collection view, inserts into the second data structure a second list indicating that offline availability of the page was initiated by offline availability of the collection view, using the second data structure. In some implementations, the operations at 416 and 420 are performed together in a single atomic operation (e.g., a single SQLite transaction) so that the page entry and its corresponding list are created consistently. For example, when collection view C1 is toggled offline and displays child page P1, the system records a list (C1, C1, P1), where C1 is the origin and source identifier and P1 is the impacted page, with this list creation occurring in the same transaction as the corresponding page entry insertion at 416.

In some implementations, the system enforces a depth limit when propagating offline availability from the origin object to the particular object to prevent infinite recursion of offline availability, using constraints in the second data structure. For example, when a user toggles a collection view C1 containing page P1, which itself contains an inline collection view C2 with page P2, the system generates lists only to a predetermined depth, such as 2, 3, or 4 levels. Thus, propagation stops before creating chains such as C1→C2→C3→C4, preventing runaway recursion while maintaining consistent offline availability for nested but bounded hierarchies.

At 424, the system stores, in local non-volatile memory, content data of the particular object for offline access by the system, using a record cache architecture that persists page data on the device's disk (e.g., in a SQLite or IndexedDB database) and optionally loads portions into working memory for client operations. For example, when a collection view C1 with 45 pages is toggled offline, the system stores the block data, properties, and hierarchical relationships of each child page, such that both structural metadata and textual content are accessible during offline states without requiring a full refetch. A refetch operation can be performed using a query to the server to reconcile the offline state of a particular object with its current structure, such that any added or removed pages are correctly reflected. For example, when refetching collection view C2, the system inserts a list (C2, C2, P3) for a newly discovered page P3 and deletes outdated lists such as (C2, C2, P2), thereby maintaining consistent offline availability relationships.

In some implementations, the system maintains the first data structure and the second data structure entirely on the client device and does not transmit those structures or lists to a server. Instead, the client uses the locally stored offline-availability information to determine which pages should be requested from the server and when. For example, when a collection view C1 is toggled offline, the client updates its local lists (e.g., inserting (C1, C1, P1)) and later, during refetch, issues network requests for the corresponding pages together with metadata such as last-downloaded timestamps or versions. The server returns updated content data for those pages, and the client applies the changes locally, avoiding full refetches for efficiency while leaving the offline-availability data structures themselves confined to the device.

Figure 5:
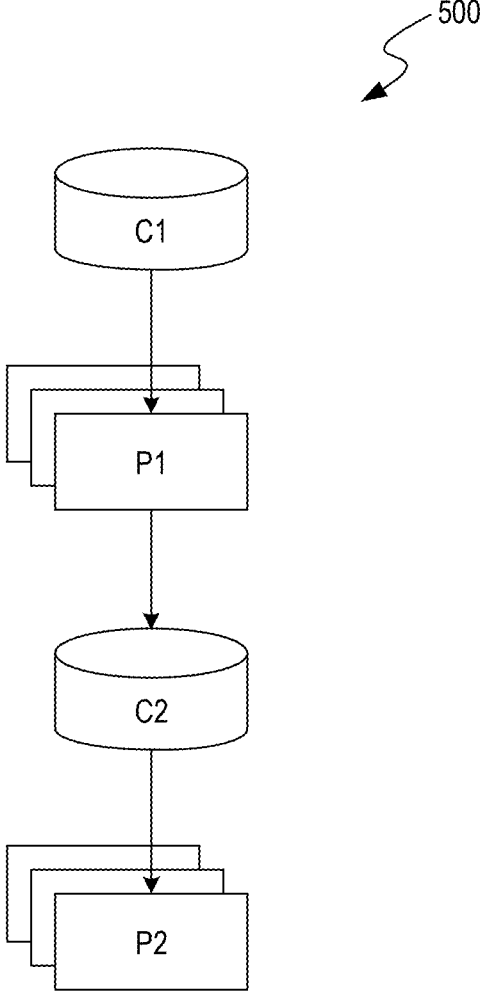
FIG. 5 is a diagram illustrating a block data model configured in accordance with various embodiments of the present technology.

FIG. 5 is a diagram illustrating a block data model configured in accordance with various embodiments of the present technology. The block data model 500 demonstrates the hierarchical structure used for organizing workspace content. The block data model 500 provides a visual representation of how collections and pages can be arranged in nested relationships to support complex content organization within collaborative workspace environments. As shown in FIG. 5, the block data model 500 includes a collection C1 positioned at the top of the hierarchy, connected to a page P1 below it. Page P1 is further connected to a collection C2, which is connected to a page P2 at the bottom of the hierarchical structure.

The hierarchical relationships illustrated in the block data model 500 demonstrate how collection views can contain pages, and how pages can serve as containers for additional nested collection views. Collection C1 represents a database structure that organizes and contains related content objects, specifically containing page P1 within its structure. Page P1 functions as a content container that can hold various types of blocks and nested content elements, including the nested collection C2. Collection C2, positioned below page P1 in the hierarchy, contains page P2, which represents another content container within the nested structure. The block data model 500 implements a hierarchical block data model where pages are technically blocks that can contain other blocks such as bullet points and images. This architecture enables flexible data organization using a tree-like structure where each collection view can contain multiple pages, and each page can serve as a container for additional nested collection views. The directional arrows in the block data model 500 represent the hierarchical relationships between the collections and pages, showing how offline availability propagates through the structure from parent objects to child objects.

The data model can enforce constraints to maintain referential integrity and prevent inconsistent chains of collection view references. In particular, the source identifier identifies at most one collection view when tracking offline availability propagation through the hierarchical structure. Using this constraint, each offline action list maintains a clear and unambiguous path of propagation from the origin object through intermediate objects to the particular object being made available offline. The constraint prevents circular references and maintains the integrity of the hierarchical relationships within the block data model 500.

The block data model 500 can support complex scenarios where content is kept offline for multiple independent reasons, such as explicit user selection combined with automatic synchronization policies. For example, when collection C1 is made available offline, the system automatically propagates offline availability to page P1, which then propagates to collection C2 and subsequently to page P2. Each level of propagation creates corresponding entries in the offline availability data structures, with lists tracking the origin, intermediate, and target objects at each step of the hierarchical traversal. In some implementations, each list further includes a type field (e.g., type=toggled or type=autosynced) that annotates the reason why the impacted page is offline, enabling multiple lists with the same origin-source-impacted triplet to coexist while representing different offline-availability conditions. For example, the system can maintain both (P2, P2, P2) [type=toggled] and (P2, P2, P2) [type=autosynced] simultaneously. When P2 is toggled off, the system deletes only those lists whose type and origin match the toggle operation (e.g., the (P2, P2, P2) [type=toggled] list), while leaving other lists intact.

Figure 6:
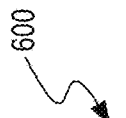
FIG. 6 is a sequence diagram illustrating offline availability management operations configured in accordance with various embodiments of the present technology.

FIG. 6 is a sequence diagram illustrating offline availability management operations configured in accordance with various embodiments of the present technology. The process 600 illustrates offline availability management operations during initial downloads, demonstrating how the system tracks and manages offline content using a list-based architecture. The process 600 provides a comprehensive view of how offline availability propagates through hierarchical content structures and how multiple independent conditions can maintain offline status for workspace objects. As shown in FIG. 6, collection C1 is toggled to be available offline, initiating a cascade of offline availability operations that create multiple lists to track the relationships and dependencies between different content objects.

When collection C1 is initially toggled offline, the system inserts a list 608 into the second data structure to record this offline action. In list 608, collection C1 serves as the origin object, the intermediate object, and the particular object being made available offline, creating a self-referential list that establishes collection C1 as the root of the offline availability chain. This list represents the foundational offline action that initiates subsequent propagation of offline availability to related content objects within the hierarchical structure. The list 608 uses identical identifiers for the origin, source, and object fields because collection C1 is explicitly toggled by the user and does not depend on any other object for its offline status.

Following the insertion of list 608, the system automatically generates a list 612 to record the propagation of offline availability from collection C1 to page P1. In list 612, collection C1 remains the origin object that initiated the offline availability chain, collection C1 serves as the intermediate object through which offline availability propagates, and page P1 becomes the particular object being made available offline. This list establishes the causal relationship between the collection view and the page, enabling the system to track that page P1 is available offline because collection C1 was toggled offline. The system downloads, e.g., 50 pages, from collection C1 when the collection view is made available offline, respecting any user-applied sort order such as most recent or alphabetical arrangements.

List 616 is generated when page P1 is explicitly toggled offline by the user. In list 616, page P1 serves as the origin object, the intermediate object, and the particular object being made available offline, similar to the self-referential structure of list 608. This list represents an independent offline action that provides a second reason for page P1 to remain available offline, demonstrating the stacking capability of the offline availability system. The creation of list 616 illustrates how a particular object can remain available offline while at least one of multiple second lists is present in the second data structure, providing redundant offline availability conditions that prevent premature removal of needed content.

When page P1 is toggled offline, the system automatically propagates offline availability to nested content within the page, creating additional lists to track these relationships. A list 628 is inserted to record the offline availability of page P2, where page P1 serves as the origin object, collection C2 serves as the intermediate object through which offline availability propagates, and page P2 becomes the particular object being made available offline. Thus, offline availability can traverse multiple levels of the hierarchical structure, moving from a page through a nested collection view to reach child pages within that collection view.

The system also creates a list 632 to establish the offline availability of collection C2 itself, where page P1 serves as the origin object and the intermediate object, while collection C2 becomes the particular object being made available offline. According to this list, the collection view containing page P2 is also tracked as available offline, maintaining the integrity of the hierarchical relationships within the offline availability system. The list 632 works in conjunction with list 628 to provide complete offline coverage for the nested content structure within page P1.

Autosync functionality is shown using list 640, which is inserted when collection C2 is automatically synchronized based on system policies such as recent access patterns or favorite designations. In list 640, collection C2 serves as the origin object, the intermediate object, and the particular object being made available offline, establishing an independent autosync-based reason for collection C2 to remain offline. In some implementations, the system stores a type field alongside each list, for example (P2, P2, P2) [type=toggled] and (P2, P2, P2) [type=autosynced]. When a user toggles off P2, the system deletes only those lists whose type and origin match the toggle operation (e.g., [type=toggled] with origin P2), while preserving autosync lists that continue to justify offline availability. This list-level typing enables different removal behaviors and user interface representations for these distinct offline availability conditions.

The autosync operation for collection C2 triggers the creation of a list 652, which records an autosync operation for page P2. In list 652, collection C2 serves as the origin object and the intermediate object, while page P2 becomes the particular object being autosynced. This list provides a second independent reason for page P2 to remain available offline and synced, in addition to the existing list 628 that was created when page P1 was toggled offline. The presence of both list 628 and list 652 demonstrates how multiple independent conditions can maintain offline availability and synchronization for the same content object, preventing premature removal when one condition is withdrawn while others remain valid.

The process 600 illustrates the dynamic nature of offline availability management by showing how lists are removed when offline conditions change. When collection C1 is un-toggled, the system removes list 608 and list 612 from the second data structure, eliminating the offline availability conditions that originated from collection C1. However, page P1 remains available offline because list 616 continues to provide an independent reason for its offline status. Similarly, when collection C2 is no longer autosynced, the system removes list 640 and list 652, but page P2 can remain available offline if list 628 continues to exist based on the offline status of page P1.

The list system demonstrated in process 600 handles complex scenarios involving linked collections that point to multiple source databases by creating offline actions for each source database and their respective children. When a linked collection view is made available offline, the system generates lists for each source database referenced by the linked collection, such that the necessary content remains accessible during offline periods. This approach prevents missing content scenarios where users attempt to access linked data that was not properly synchronized for offline use.

The process 600 maintains referential integrity by enforcing constraints that prevent inconsistent chains of collection view references, such that each list maintains a clear and unambiguous path of offline availability propagation. The system can implement depth limits to prevent infinite recursion when traversing hierarchical content structures, typically limiting propagation to a maximum of 2, 3, or 4 levels to balance offline coverage with system performance considerations. With these constraints, the list-based tracking system remains efficient and reliable even in complex workspace environments with deeply nested content hierarchies.

Figure 7:
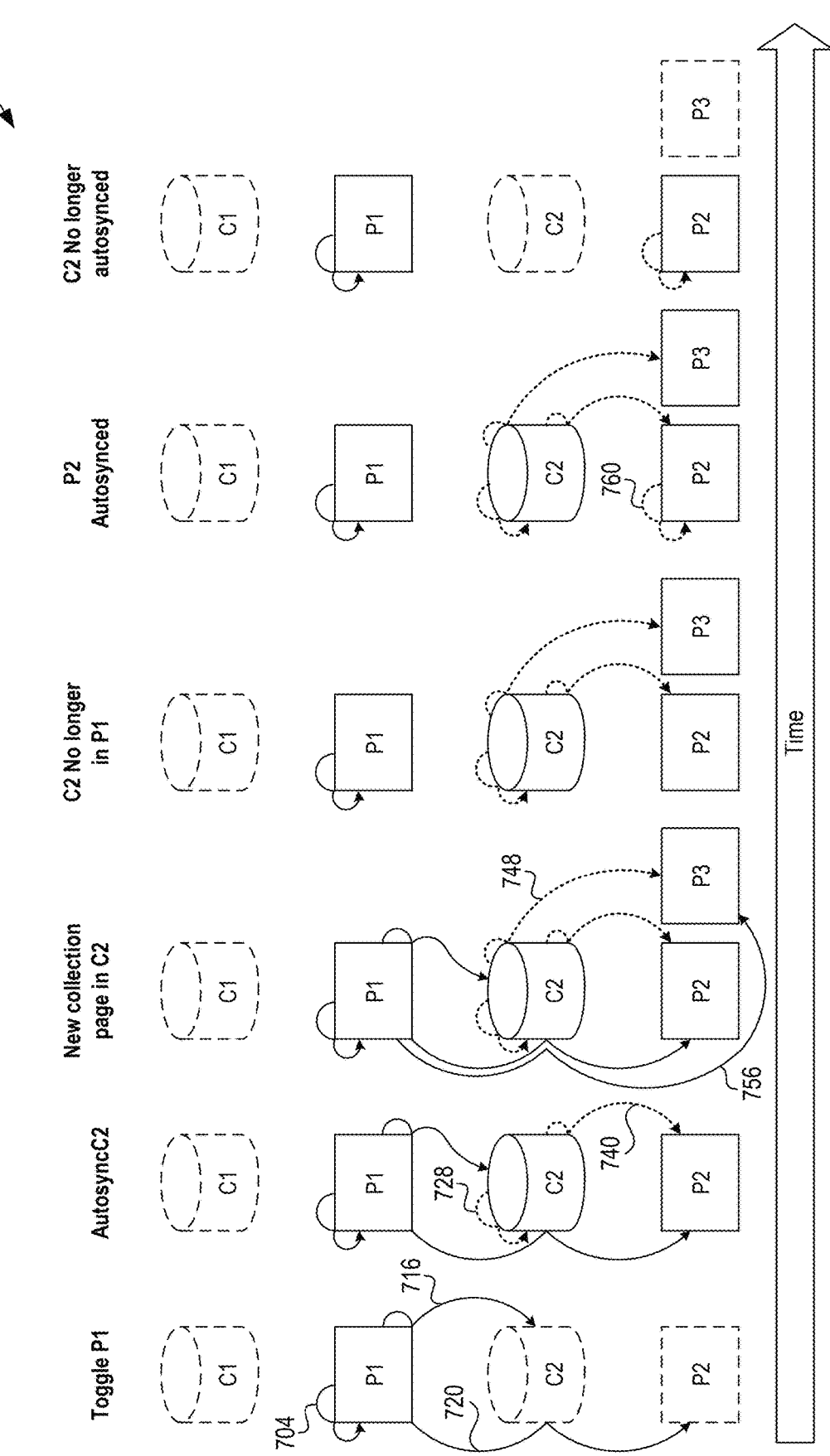
FIG. 7 is a sequence diagram illustrating offline availability management operations configured in accordance with various embodiments of the present technology.

FIG. 7 is a sequence diagram illustrating offline availability management operations configured in accordance with various embodiments of the present technology. The process 700 illustrates offline availability management operations during content changes, demonstrating how the system coordinates list-based tracking when workspace content undergoes dynamic modifications. The process 700 provides a comprehensive framework for managing offline availability during scenarios where pages are added to collection views, collection views are removed from pages, and content hierarchies are restructured through reparenting operations. As shown in FIG. 7, the process 700 employs a list management system that maintains referential integrity while accommodating the fluid nature of collaborative workspace environments where content structures can change frequently during active collaboration sessions.

A list 704 is generated and stored when page P1 is toggled offline. In list 704, page P1 serves as the origin object, the intermediate object, and the particular object being made available offline, establishing a foundational offline availability condition that initiates subsequent propagation operations throughout the hierarchical content structure. The list 704 represents an explicit user-initiated offline action that creates a self-referential tracking record, enabling the system to distinguish between manually toggled content and automatically synchronized content when managing offline availability states during content modification scenarios.

Following the insertion of list 704 into the second data structure, the system automatically generates a list 716 to make collection C2 available offline as part of the hierarchical propagation process. In list 716, page P1 serves as the origin object and the intermediate object, while collection C2 becomes the particular object being made available offline. This list establishes the causal relationship between the explicitly toggled page and the nested collection view, such that the collection view remains accessible during offline periods when users navigate through the hierarchical content structure contained within page P1.

List 720 is automatically generated to record the offline availability of page P2, which is displayed by collection C2. In list 720, page P1 serves as the origin object that initiated the offline availability chain, collection C2 serves as the intermediate object through which offline availability propagates, and page P2 becomes the particular object being made available offline. This list demonstrates the system's capability to traverse multiple levels of hierarchical nesting, such that child pages within nested collection views remain accessible when their parent containers are made available offline through explicit user actions or automatic synchronization policies.

Autosync functionality is implemented using a list 728, which is generated when collection C2 is automatically synchronized based on system policies such as recent access patterns or favorite page designations. In list 728, collection C2 serves as the origin object, the intermediate object, and the particular object being made available offline, creating an independent autosync-based condition for collection C2 to remain offline. The system distinguishes between manually toggled and automatically synchronized content using autosync type fields within the list structure, enabling different removal behaviors and user interface representations for these distinct offline availability conditions during content modification operations.

The autosync operation for collection C2 triggers the creation of a list 740, which manages the automatic offline availability of page P2 based on the autosync condition applied to its parent collection view. In list 740, collection C2 serves as the origin object and the intermediate object, while page P2 becomes the particular object being made available offline. This list provides a second independent reason for page P2 to remain available offline, working in conjunction with list 720 to demonstrate how multiple independent conditions can maintain offline availability for the same content object during dynamic content modification scenarios.

Dynamic content changes are addressed using a list 756, which is generated when a new page P3 is added to collection C2 during active collaboration sessions. The list 756 represents the system's capability to manage real-time content modifications while maintaining offline availability consistency across distributed collaborative environments. When new pages are added to collection views that are already available offline, the system automatically extends offline availability to these new pages by creating corresponding lists that maintain the same origin and intermediate object relationships as existing pages within the collection view.

The system generates a list 748 to record the autosync of page P3 when collection C2 is automatically synchronized, such that newly added pages receive the same offline availability treatment as existing pages within the collection view. In list 748, collection C2 serves as the origin object and the intermediate object, while page P3 becomes the particular object being made available offline. According to this list, new content added to autosynced collection views automatically inherits the offline availability status of the parent collection view, maintaining consistency in offline content coverage during dynamic workspace modifications.

The system can manage content removal scenarios, e.g., when collection C2 is removed from page P1, triggering the removal of lists 716, 720, and 756 from the locally persisted data structures (e.g., SQLite tables on the device's disk) and any corresponding in-memory representations. This removal operation illustrates how the system maintains referential integrity by eliminating offline availability conditions that are no longer valid due to structural changes in the workspace content hierarchy. The system performs these removal operations atomically to prevent inconsistent states where offline availability lists reference content objects that are no longer part of the hierarchical structure.

Following the removal of collection C2 from page P1, list 760 is generated when page P2 is independently autosynced based on system policies. In list 760, page P2 serves as the origin object, the intermediate object, and the particular object being made available offline, establishing a new independent condition for page P2 to remain offline despite the removal of its previous parent-child relationship with page P1. This list demonstrates how the system can maintain offline availability for content objects even when their hierarchical relationships change, such that users retain access to needed content during structural modifications.

When collection C2 is no longer autosynced, the process 700 removes lists 728, 740, and 748 from the locally persisted data structures (e.g., SQLite tables on the device's disk) and any corresponding in-memory representations, eliminating the autosync-based offline availability conditions while preserving any remaining independent conditions such as list 760. Using this selective removal process, content objects remain available offline when supported by valid offline availability conditions, while removing outdated conditions that no longer reflect the current state of the workspace content structure. The process 700 implements delta updates that send only changed portions of pages rather than complete page refetches when coming back online after periods of offline operation. These delta updates enable efficient synchronization by transmitting incremental changes rather than full content downloads, reducing bandwidth usage and improving synchronization performance during connectivity restoration. The system maintains a running log of all updates that have happened to pages, enabling clients to receive exact updates that occurred since their last online session rather than downloading complete page content.

The system can use Conflict-free Replicated Data Types (CRDTs) for resolving conflicts when multiple users edit the same content simultaneously during offline and online collaboration scenarios. The CRDTs enable convergent edits when multiple users modify the same content chunks, such that collaborative modifications result in consistent final states regardless of the order in which updates are applied or the timing of synchronization operations. The CRDT implementation resolves conflicts for text editing scenarios where multiple users edit the same content blocks concurrently.

The process 700 synchronizes entries and lists with a server using idempotent and commutative updates, such that the entries and lists are synchronized with the server regardless of a number of times the updates are received or an order in which the updates are applied to the server. These idempotent and commutative properties enable reliable synchronization even in unstable network conditions where updates can be duplicated, reordered, or delivered multiple times during connectivity restoration periods. The system maintains consistency across distributed nodes such that repeated application of the same update operations produces identical results.

In response to a refetch operation associated with a particular object, the process 700 can limit propagation of offline availability of the particular object by updating lists to prevent the list from establishing an inconsistent chain of collection view references. With this limitation mechanism, refetch operations maintain referential integrity within the hierarchical content structure by preventing circular references and maintaining clear propagation paths from origin objects through intermediate objects to target objects. The system enforces these constraints during refetch operations to prevent inconsistent states that could arise from concurrent modifications during synchronization processes.

FIG. 8 is a flow diagram illustrating a process for removing database objects from offline availability. In some implementations, the process is performed by a computer system, e.g., example computer system 900 illustrated and described in more detail with reference to FIG. 9. Particular entities, for example, platform 100 perform some or all of the steps of the process in other implementations. Platform 100 is illustrated and described in more detail with reference to FIG. 1. Likewise, implementations can include different and/or additional steps or can perform the steps in different orders.

At 804, a system maintains an entry indicating that a particular object of a database system is available offline, e.g., by storing the entry in a locally persisted data structure such as a SQLite table on the device's disk and optionally loading it into memory for client operations, thereby providing durable storage of availability states. For example, when collection view C1 with 50 child pages is toggled offline, the system inserts an entry for C1 and corresponding entries for child pages such as P1, such that each record remains cached, e.g., in IndexedDB or SQLite, so that both C1 and P1 are retrievable during offline access without requiring server communication.

In some implementations, the entry is associated with a state machine including states including a downloadable state and an available state, using structured transitions to reflect the synchronization progress of offline content. When a request identifies a collection view C2 with child page P2 for offline availability, the system first inserts an entry for P2 into the first data structure and assigns it the downloadable state, indicating that the page has been marked for download but the content data has not yet been persisted locally. Once the system retrieves the block data, properties, and hierarchical relationships of P2 and stores them in a locally persisted data store (e.g., on disk) and, as needed, in memory for client use, the state of the entry transitions to the available state. In this way, P2 is not prematurely surfaced as offline-ready until the data has been fully cached. The same mechanism applies across nested hierarchies, enabling the system to manage multiple pages in different states simultaneously, providing consistency and transparency in offline availability.

At 808, the system maintains one or more lists indicating one or more conditions causing the particular object to be available offline, using the second data structure to track origins and sources. In some implementations, these lists are stored in locally persisted tables (e.g., SQLite on the device's disk) and may be loaded into memory for client operations. For example, page P2 displayed in collection view C2 can be associated with lists (P1, C2, P2), (C2, C2, P2), and (P2, P2, P2), each reflecting a different cause. The system preserves these lists until all such conditions are removed, such that P2 remains consistently available offline.

In some implementations, the system improves robustness under unstable network conditions without synchronizing the data structures that track offline availability to a server. The first data structure that stores entries representing each page available offline and the second data structure that stores lists identifying origin, source, and impacted page relationships are maintained locally on the client device. For example, when a user toggles a collection view C1 that displays child page P1, the client inserts an entry for P1 and a list (C1, C1, P1) into its local data structures. During a subsequent refetch, the client consults these local structures to determine which objects are expected to be available offline and issues network requests for those objects together with metadata such as a last-downloaded timestamp and a last-downloaded version. The server returns content data that is newer than the client's recorded state, and the client itself is responsible for updating the local cache and offline-availability structures based on the changes it observes. Newer server data always supersedes older local state, and the client's update logic is designed so that the offline tables become eventually consistent even if some network requests are retried, dropped, or received out of order. This approach enables the system to handle connectivity disruptions and concurrent edits while avoiding duplicate entries or inconsistent offline states, without transmitting the offline-availability lists themselves to the server.

In some implementations, in response to a refetch operation associated with the particular object, the system limits propagation of offline availability by updating the one or more lists to prevent creation of an inconsistent chain of collection view references. This is performed using the second data structure, where each list links an origin, a source, and an impacted page. For example, if page P2 is displayed in collection view C2 and reparented during a refetch, the system deletes outdated lists such as (P1, C2, P2) and inserts updated lists reflecting the new parent-child relationship, such that offline inheritance does not exceed the allowed depth of one collection view per list. Because collections cannot directly parent other collections, the constraints prevent invalid chains such as C1→P1→C2 from persisting in conflict with invariant rules. This enables offline propagation to remain well-formed, consistent across nested structures, and resistant to errors introduced by dynamic reorganization of collection views.

At 812, the system receives a request to remove the particular object from offline availability, using a client toggle that updates both the first and second data structures. For example, when a user unselects collection view C1 containing 30 child pages, the system records a removal request for C1 and propagates deletions for associated lists such as (C1, C1, P1). The request provides the result that C1 and its children are no longer maintained offline unless other independent autosync or explicit origins remain.

At 816, the system uses the second data structure to remove a list of the one or more identifiers from the locally persisted data structures and any corresponding in-memory representations, thereby accurately updating the offline state of the particular page. For example, if page P2 is made available offline as a result of toggling collection view C1, the system may have inserted a list (C1, C1, P2), where C1 serves as both the origin and source identifiers, and P2 is the impacted object. When the user issues a request to remove C1 from offline availability, the system deletes this list, thereby removing one cause for P2's offline status. In another case, if P2 was also offlined using an inline collection view C2, the system removes the list (P1, C2, P2) when the user toggles P1 off, but retains other lists associated with different origins until their removal is explicitly requested. With this structured removal process, a page is only removed from offline availability when no lists remain, preventing premature deletions and maintaining consistency in hierarchical offline relationships.

At 820, the system determines whether the one or more lists have been removed from the system, using consistency checks on the second data structure that is persisted locally on the device to evaluate whether any conditions remain for a particular page. For instance, page P3 can be linked by lists (P2, C3, P3) and (P3, P3, P3). The system examines the second data structure to determine whether any lists remain in which P3 appears in the impacted (last) position. If at least one such list is present, P3 is treated as still available offline. Only when no lists remain with P3 in the impacted field does the system conclude that P3 is no longer available offline.

At 824, the system, in response to determining that no lists remain in which the particular page appears as the impacted object, deletes the entry associated with the particular page from a locally persisted data store using the first data structure and removes the corresponding cached content data from working memory. For example, when a page P2 within collection view C2 is represented by lists such as (C2, C2, P2) and (P2, P2, P2), the system first verifies that there are no remaining lists in which P2 appears as the impacted page. Only after all such lists have been cleared for a page such as P2 does the system delete the first data structure row for P2 along with its stored block data, properties, and hierarchical relationships reclaiming disk and memory resources and providing efficient offline state management.

In some implementations, wherein the particular object is a collection view, the system is caused to remove a second entry identifying a page displayed by the collection view and to remove a second list indicating that offline availability of the page was initiated by offline availability of the collection view. The removal process is performed using the first data structure to delete the entry for the impacted page and the second data structure to remove the list that tracks the propagation of availability. For example, when a user untoggles collection view C1 that previously displayed 20 child pages, the system removes the first data structure entry for a child page P1 and deletes the list (C1, C1, P1), which explicitly recorded that P1 was offlined by C1. If P1 had also been independently autosynced as a recent page, that separate entry and list would remain, thereby preserving P1's offline availability until all origins are cleared. By decoupling the entry removal from list tracking, the system provides more accurate state management in complex hierarchies, preventing premature deletion while maintaining consistency across nested pages and multiple collection views.

In some implementations, in response to removing the particular object from offline availability, the system removes, from the locally persisted data structures and any corresponding in-memory representations, another list associating the particular object with another object, using the second data structure to provide more accurate dependency management. For example, if collection view C1 displaying page P1 was toggled offline, the system initially created lists such as (C1, C1, P1). When C1 is un-toggled, that list is deleted, leaving P1's offline availability to depend on other conditions. If P1 is also autosynced because it is a recent page, the system maintains an independent list (P1, P1, P1), such that P1 remains available offline despite the removal of C1. Conversely, if the autosync condition is later expired or disabled, the list for P1 is also removed, and the system deletes the first data structure entry and cached content data for P1. This approach prevents premature removal of pages that are still supported by active origins, such that storage is reclaimed only after all autosync or explicit offline-availability conditions have been withdrawn. By isolating autosync lists from those tied to manual toggles, offline availability is both transparent to the user and resilient to overlapping reasons for persistence.

Computer System

Figure 9:
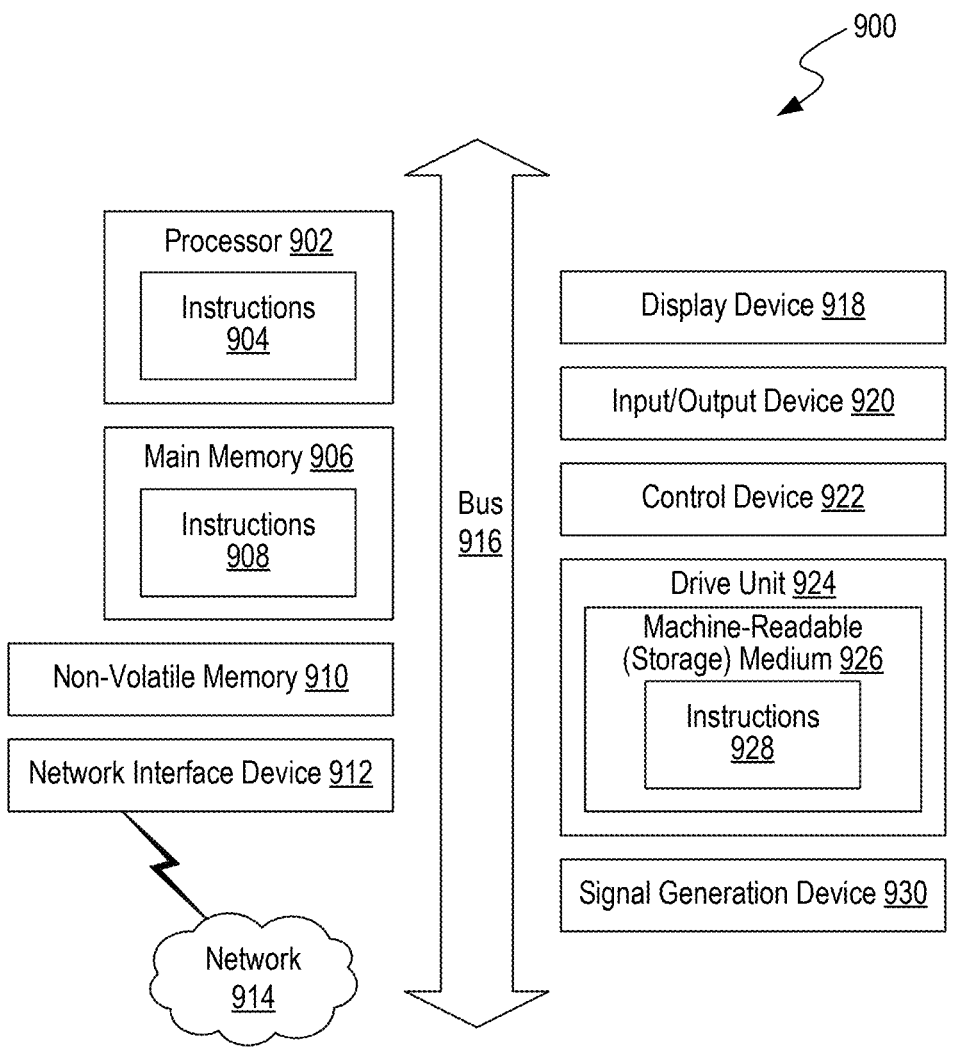
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, wearable electronic device, network-connected ("smart") device (e.g., a television or home assistant device), augmented reality/ virtual reality (AR/VR) system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer (SBC) system, or a distributed system such as a mesh of computer systems or include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computer system 900. The machine-readable medium 926 can be non-transitory or include a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically include one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a set of two or more items covers all of the following interpretations of the word: any of the items in the set, all of the items in the set, and any combination of the items in the set. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

receive a request identifying a particular object of a database system to be made available offline;

in response to receiving the request:

insert, into a first data structure stored in a memory of the system, a first entry identifying the particular object; and insert, into a second data structure stored in the memory of the system, a first list indicating a condition causing the particular object to be made available offline, wherein the first list comprises:

an origin identifier identifying an origin object of the database system that initiated offline availability of the particular object, a source identifier identifying an intermediate object of the database system through which offline availability of the particular object propagates, and an object identifier identifying the particular object as available offline;

in response to the particular object being a collection view:

insert, into the first data structure, a second entry identifying a page displayed by the collection view; and insert, into the second data structure, a second list indicating that offline availability of the page was initiated by offline availability of the collection view; and store, in the memory of the system, content data of the particular object for offline access by the system.

2. The non-transitory, computer-readable storage medium of claim 1, wherein a plurality of second lists are associated with the particular object, and wherein the particular object remains available offline while at least one of the plurality of second lists is present in the second data structure.

3. The non-transitory, computer-readable storage medium of claim 1, wherein the system is caused to:

determine a count of a number of first lists in which the particular object is identified as the object identifier, wherein each of the first lists is associated with a different parent object that caused the particular object to be made available offline; and remove the first entry and the content data of the particular object from the memory of the system in response to determining that the count equals zero.

4. The non-transitory, computer-readable storage medium of claim 1, wherein the system is caused to:

synchronize the first data structure and the second data structure with a server by transmitting, to the server, an update to at least one of:

the first or second entries, or the first or second lists; and synchronize the particular object with a server by transmitting, to the server, an update to the content data.

5. The non-transitory, computer-readable storage medium of claim 1, wherein the request toggles an offline availability state of the particular object.

6. The non-transitory, computer-readable storage medium of claim 1, wherein the request is generated by the system in accordance with a synchronization policy.

7. The non-transitory, computer-readable storage medium of claim 1, wherein the source identifier identifies at most one collection view.

8. A system comprising:

at least one hardware processor; and at least one non-transitory computer-readable storage medium storing instructions, which, when executed by the at least one hardware processor, cause the system to:

maintain, in a memory of the system, an entry indicating that a particular object of a database system is available offline;

maintain, in the memory of the system, one or more lists indicating one or more conditions causing the particular object to be available offline;

receive a request to remove the particular object from offline availability;

remove, from the memory of the system, a list of the one or more lists, wherein the list comprises:

an origin identifier identifying an origin object of the database system that initiated offline availability of the particular object, wherein the origin identifier is associated with the request, a source identifier identifying an intermediate object of the database system through which offline availability of the particular object propagated, and an object identifier identifying the particular object as offline;

determine whether the one or more lists have been removed from the memory of the system;

in response to determining that the one or more lists have been removed:

remove, from the memory of the system, the entry; and remove, from the memory of the system, content data of the particular object.

9. The system of claim 8, wherein determining whether the one or more lists have been removed comprises:

determining a count a number of the one or more lists in which the particular object is identified as the object identifier, wherein each of the one or more lists is associated with a different parent object that caused the particular object to be made available offline, and wherein the entry and the content data of the particular object are removed from the memory of the system in response to determining that the count equals zero.

10. The system of claim 8, wherein the particular object is a collection view, and wherein the system is caused to:

remove, from the memory of the system, a second entry identifying a page displayed by the collection view; and remove, from the memory of the system, a second list indicating that offline availability of the page was initiated by offline availability of the collection view.

11. The system of claim 8, wherein the system is caused to:

synchronize the entry and the one or more lists with a server using idempotent and commutative updates, wherein the entry and the one or more lists are synchronized with the server regardless of a number of times the updates are received or an order in which the updates are applied to the server.

12. The system of claim 8, wherein the entry is associated with a state machine comprising states including a downloadable state and an available state, and wherein the system transitions a state of the entry from the downloadable state to the available state in response to storing the content data of the particular object in the memory of the system.

13. The system of claim 8, wherein the system is caused to:

in response to a refetch operation associated with the particular object:

limit propagation of offline availability of the particular object by updating the one or more lists to prevent the list from establishing an inconsistent chain of collection view references.

14. The system of claim 8, wherein the system is caused to:

In response to removing the particular object from offline availability, remove, from the memory of the system, another list associating the particular object with another object, wherein the other object remains available offline based on an autosync condition applied to the other object, and wherein the other object is removed from offline availability in absence of the autosync condition.

15. A method comprising:

receiving, at a system, a request identifying a particular object of a database system to be made available offline;

in response to receiving the request:

inserting, into a first data structure stored in a memory of the system, a first entry identifying the particular object; and inserting, into a second data structure stored in the memory of the system, a first list indicating a condition causing the particular object to be made available offline, wherein the first list identifies (1) an origin object of the database system that initiated offline availability of the particular object, (2) an intermediate object of the database system through which offline availability of the particular object propagates, and (3) the particular object as available offline;

in response to the particular object being a collection view:

inserting, into the first data structure, a second entry identifying a page displayed by the collection view; and inserting, into the second data structure, a second list indicating that offline availability of the page was initiated by offline availability of the collection view; and storing, in the memory of the system, content data of the particular object for offline access by the system.

16. The method of claim 15, comprising:

enforcing a depth limit when propagating offline availability from the origin object to the particular object to prevent infinite recursion of offline availability of the particular object.

17. The method of claim 15, comprising:

determining a count of a number of first lists in which the particular object is identified as the object identifier, wherein each of the first lists is associated with a different parent object that caused the particular object to be made available offline; and removing the first entry and the content data of the particular object from the memory of the system in response to determining that the count equals zero.

18. The method of claim 15, comprising:

synchronizing the first data structure and the second data structure with a server by transmitting, to the server, an update to at least one of:

the first or second entries, or the first or second lists; and synchronizing the particular object with a server by transmitting, to the server, an update to the content data.

19. The method of claim 15, wherein the request toggles an offline availability state of the particular object.

20. The method of claim 15, wherein the request is generated by the system in accordance with a synchronization policy.

* * * * *